G. F. PENNINGTON.
CONTROLLING DEVICE FOR HEADLIGHTS.
APPLICATION FILED JUNE 24, 1920.

1,376,225.

Patented Apr. 26, 1921.

INVENTOR.
G. F. Pennington
BY
ATTORNEY.

UNITED STATES PATENT OFFICE.

GLOVER FRANKLIN PENNINGTON, OF TUSCUMBIA, ALABAMA.

CONTROLLING DEVICE FOR HEADLIGHTS.

1,376,225.     Specification of Letters Patent.     Patented Apr. 26, 1921.

Application filed June 24, 1920. Serial No. 391,507.

*To all whom it may concern:*

Be it known that I, GLOVER FRANKLIN PENNINGTON, a citizen of the United States, residing at Tuscumbia, in the county of Colbert and State of Alabama, have invented certain new and useful Improvements in Controlling Devices for Headlights; and I do hereby declare the following to be a full, clear, and exact description of the invention, such as will enable others skilled in the art to which it appertains to make and use the same.

This invention relates to a controlling device for headlights, and is especially adapted for use in connection with a headlight carried by a locomotive, but may also be used for controlling the headlights for an automobile, or other vehicle.

One object of the invention is to provide means for controlling the casing of a headlight automatically from the running gear, so that the light may be directed in the proper path when the locomotive or motor vehicle is rounding a curve or when its path is deflected from the normal course of travel.

A further object is to provide in connection with the casing of a headlight mounted for partial rotary movement, means for effecting such movement automatically and comprising devices actuated by the angular movement of the truck of the locomotive when the latter is rounding a curve.

A still further object of the invention resides in the provision of a headlight mounting which will be of simple construction and operation and which may be readily incorporated in the conventional form of locomotive or motor vehicles without extensive alterations in the construction or design thereof.

With the foregoing and other objects in view as will appear as the description proceeds, the invention consists in the novel construction, combination and arrangement of coöperating elements as hereinafter more specifically set forth, pointed out in the appended claims and shown in the accompanying drawings forming a part of the present application and in which:

Figure 1:
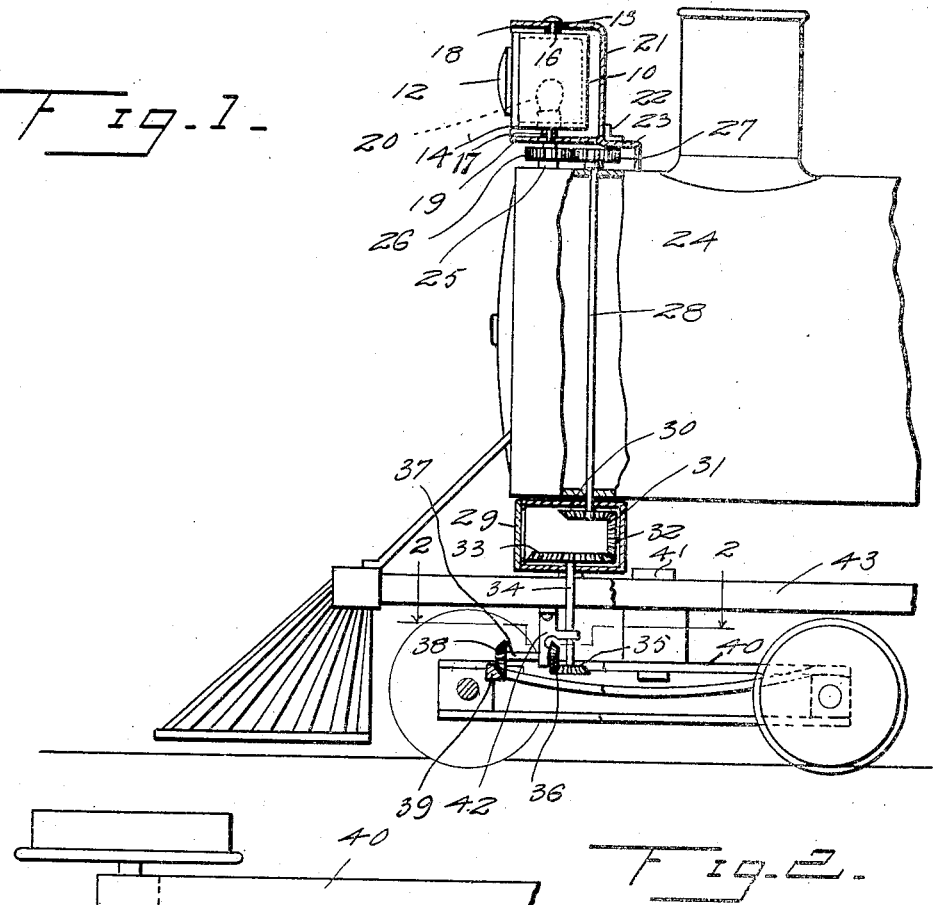
Figure 1 is an elevation of a portion of a locomotive, partly in section to disclose the present device applied thereto.
Figure 2:
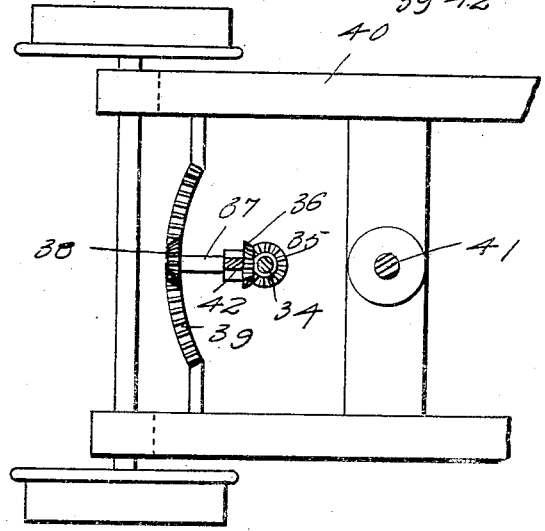
Fig. 2 is a detail sectional view on the plane of line 2—2 of Fig. 1, looking in the direction indicated by the arrows.

The headlight *per se* includes a casing 10 provided with the usual lens 12, the casing having upper and lower pivotal elements 13 and 14 mounted in bearings 16 and 17 in the upper and lower frame elements 18 and 19. The lamp within the casing is designated by the numeral 20. The upper and lower frame elements 18 and 19 are connected by a vertical rear frame member 21 which is connected at its lower edge by a suitable connecting plate 22 with an angular support 23 mounted in place of the locomotive boiler 24 or upon some suitable forward portion of a vehicle when the device is applied to a vehicle such as an automobile.

The lower pivotal element 14 is extended downwardly through the lower frame element 19 and has its lower end rotatably mounted in a suitable bearing 25 provided therefor on the locomotive boiler 24. The beveled gear 26 is mounted upon a portion of this pivotal element 14 beneath the lower frame element 19 and a second beveled gear 27 meshes with the beveled gear 26. This beveled gear 27 is carried on a vertical shaft 28 which extends downwardly through the boiler 24 and into the gear casing 29 beneath the boiler 24. A beveled gear 30 is mounted on the lower extremity of the shaft 28 within the gear casing 29 and meshes with a beveled gear 31 carried on a stub shaft 32 also journaled in the gear casing 29. A driving beveled gear 33 meshes with the beveled gear 32 within the gear casing 29 and is carried on a depending shaft 34 extended through the bottom of the gear casing 29. This shaft 34 has a beveled gear 35 on its lower extremity which meshes with the beveled gear 36 carried on one end of the short horizontal shaft 37 which horizontal shaft 37 has a second beveled gear 38 mounted on its opposite end and engaging the teeth of the arcuate rack 39 carried by the truck 40 of the locomotive. The arcuate rack 39 is arranged concentrically with respect to the vertical pivotal member 41 of the truck 40 and upon which the latter turns beneath the boiler 24. It will therefore be seen that the headlight will be turned automatically as the locomotive rounds a curve. It will be understood that a suitable bearing bracket 42 is provided above the truck 40 for the shaft 37 and preferably depending from the frame or supporting frame work 43 for the boiler 24 and beneath which frame work 43 the truck 40 is mounted.

It is believed that the vital importance that the rays of light of the headlight of a locomotive or from the headlight of a motor vehicle being thrown directly in the path of travel will be evident to parties familiar with inventions of this character. Such a construction as described in the foregoing paragraphs and shown in the accompanying drawings will serve as means for effecting such results automatically and without connecting the lamp and the steering gear, as when the device is applied to a motor vehicle, it being obvious that the segmental rack or other device imparting movement to the vertical shaft may be mounted so as to avoid any direct connection with the steering gear.

While the preferred embodiment of the invention has been shown and described, it will be understood that minor changes in the details of construction and arrangement of parts may be resorted to within the scope of what is claimed without departing from the spirit of the invention.

What is claimed is:—

In a device of the class described, the combination with a headlight and a truck of a locomotive, of a supporting frame for rotatably mounting the casing of the headlight, a gear casing beneath the boiler, a plurality of intermeshing gears within said gear casing, a shaft extended upwardly from one of said gears and through the upper wall of said gear casing, a second shaft extended downwardly from another of said gears and through the lower wall of said gear casing, connections between the upwardly extended shaft and the casing of the headlight to rotate the latter a limited distance in either direction, a segmental rack carried by said truck and arranged concentrically with respect to the pivotal point of said truck, and connections between said segmental rack and the downwardly extended shaft to operate the intermeshing gears within said gear casing upon turning of the truck in either direction.

In testimony whereof I affix my signature in presence of two witnesses.

GLOVER FRANKLIN PENNINGTON.

Witnesses:
S. P. COOPER,
J. H. PALMER.